United States Patent Office 3,455,385
Patented July 15, 1969

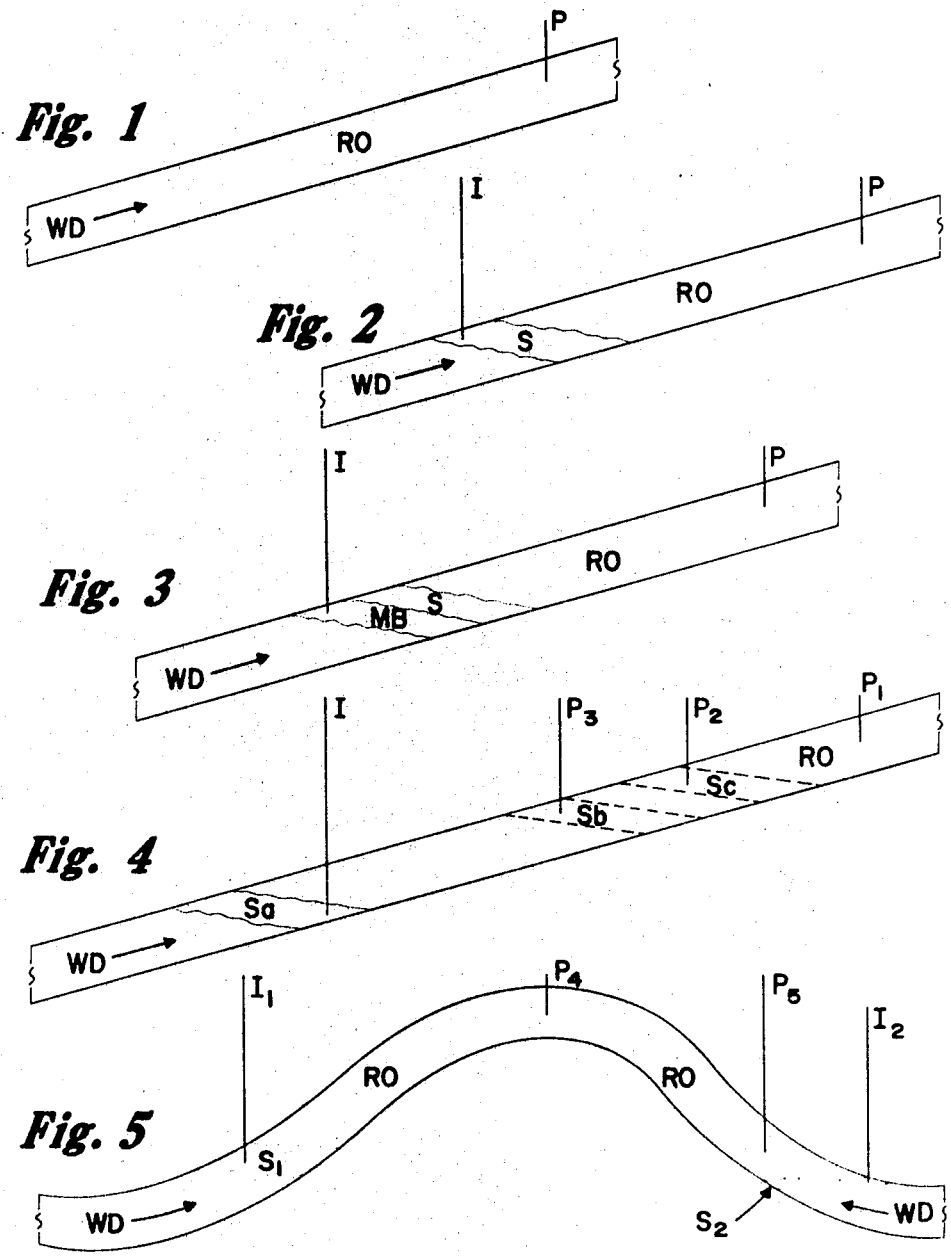

3,455,385
PRODUCTION OF CRUDE OIL FROM A WATERED-OUT SUBTERRANEAN FORMATION
William B. Gogarty, Littleton, Colo., assignor to Marathon Oil Company, Findlay, Ohio, a corporation of Ohio
Filed Dec. 26, 1967, Ser. No. 693,444
Int. Cl. E21b *43/16, 43/20*
U.S. Cl. 166—274           17 Claims

ABSTRACT OF THE DISCLOSURE

Production of crude oil from a "watered-out," oil-bearing permeable subterranean formation having hydrodynamically controlled water naturally moving therethrough is effected by injecting a micellar dispersion and, optionally, a mobility buffer behind the micellar dispersion and letting the hydrodynamically controlled water move the micellar dispersion through the formation to displace crude oil therefrom.

BACKGROUND OF THE INVENTION

Micellar dispersions are useful in secondary-type recovery processes (especially tertiary recovery) for recovering residual oil in a subterranean formation. This is usually effected by injecting a micellar dispersion into the formation and displacing it by a water drive towards at least one production means and recovering crude petroleum therefrom. Recovery of up to about 100% of the oil in place can be realized from such a process. Examples of such systems are defined in United States Patent Nos. 3,275,075; 3,261,399; and 3,254,714.

Applicant has discovered that residual oil in a "watered out" permeable subterranean formation characterized as having hydrodynamically controlled water naturally move therethrough can be recovered by injecting into the formation a micellar dispersion (and optionally a mobility buffer behind the dispersion) and letting the hydrodynamically controlled water move the dispersion through the formation toward a production well. The micellar dispersion can have a specific gravity equal to about that of the combination of residual oil and interstitial water and between that of the specific gravity of this combination and that of a waterdrive. Recovery of the crude oil is the ultimate purpose of this invention but it is recognized that some interstitial water (probably a large quantity at first) will be recovered along with the crude oil. Therefore, wherever crude oil is used it is meant to include interstitial water—this combination is also referred to as formation fluids. The term "watered-out" formation defines an oil-bearing reservoir wherein it has become economically unattractive to continue oil production. The term "residual oil saturation" as used herein is meant to include oil saturations within subterranean formations wherein it has become economically unattractive to recover the oil by conventional means.

DESCRIPTION OF THE DRAWINGS

FIGURE 1 represents a cross section of a "watered-out" formation having WD (hydrodynamically controlled water drive) naturally moving through the formation wherein RO (residual oil) is present. P (production means) represents a "watered-out" well in fluid communication with the formation.

FIGURE 2 represents the same formation having I (injection means) in fluid communication with the formation and S (a micellar dispersion slug) has been injected into the formation. WD will move S through the formation to displace RO, the latter being recovered at P.

FIGURE 3 is similar to FIGURE 2 except MB (a mobility buffer fluid) is injected after S. Preferably, MB has a specific gravity equal to or slightly less than S.

FIGURE 4 illustrates a "watered-out" formation having a series of Ps and small but sufficient amounts of micellar dispersion slugs are injected through I, $P_3$ and $P_2$ at different intervals. That is, $S_a$ is initially injected, then as $S_a$ approaches $P_3$, $S_b$ is injected through $P_3$ and as $S_b$ approaches $P_2$, $S_c$ is injected through $P_2$—the RO is produced at any or all Ps' "upstream" of the micellar dispersion.

FIGURE 5 illustrates an anticline having WD (from both sides) flowing toward $P_4$ and $P_5$. Micellar dispersions $S_1$ and $S_2$ are injected into $I_1$, and $I_2$, respectively, and WD moves the dispersions toward $P_4$ and $P_5$. RO is recovered through $P_4$ and $P_5$.

DESCRIPTION OF THE INVENTION

The oil-bearing formations useful with this invention include those reservoirs characterized as having a hydrodynamically controlled water drive and which have been "watered-out." The term "hydrodynamically controlled water drive" is meant to include aquifers as taught in chapter 5, Craft and Hawkins' Applied Petroleum Reservoir Engineering, Prentice-Hall, Inc. (1959). Means for supplying the hydrodynamically controlled water drive include (a) expansion of water, (b) expansion of known or unknown hydrocarbon accumulations in aquifer rock, (c) compressibility of the aquifer rock, (d) artesian flow where the aquifer rises to a level above the reservoir, whether it outcrops or not, and whether or not the outcrop is replenished by surface water, and (e) any means wherein water is naturally moved through the formation. The formation should be permeable to crude petroleum, micellar dispersions, the water drive and optionally, mobility buffer. One or more production means can be drilled into the formation to produce the crude oil. Examples of reservoirs include anticlines, monoclines including one having a stratographic trap at the higher elevation and a water drive at the lower end of the formation, etc.

The term "micellar dispersion" as used herein is meant to include "microemulsions" [Schulman and Montagne, Annals of the New York Academy of Sciences, 92, pp. 366–371 (1961)], oleopathic hydro-micelles [Hoar and Schulman, Nature, 152, p. 102 (1943)], "transparent" emulsions (Blair, Jr. et al., United States Patent No. 2,356,205) and micellar solutions, examples of the latter are defined in United States Patent Nos. 3,254,714; 3,275,075; 3,301,325; 3,307,628 and 3,330,344. Micellar dispersions are thermodynamically stable. Examples of micellar dispersions include those found in United States Patent No. 3,348,611 to Reisberg.

The micellar dispersion is composed essentially of hydrocarbon, an aqueous medium such as water, and surfactant sufficient to impart micellar characteristics to the mixture. Examples of hydrocarbon include crude oil, straight-run gasoline such as lower hydrocarbon fractions equal to or greater than at least pentane, crude column overheads, crude column side cuts, and liquefied petroleum gases. Useful surfactants include alkyl aryl sulfonates, more commonly known as petroleum sulfonates or as alkyl aryl naphthenic sulfonates. Such petroleum sulfonates can be identified by the empirical formula $C_nH_{2n-10}SO_3M$ wherein $n$ is an integer from about 20 to about 30 and M is a monovalent ion such as sodium, potassium, ammonium, etc. Examples of other useful surfactants are found in United States Patent No. 3,254,714.

In addition, the micellar dispersion can contain semipolar organic compound (also identified as co-surfactants) such as ketones, esters, amides, and alcohols containing from one up to about 20 carbon atoms. Preferably, the semi-polar compound is an alcohol, e.g. ethanol, isopropanol, n- and isobutanol, the amyl alcohols, 1- and 2-hexanol, 1- and 2-octanol, decyl alcohols, p-nonyl phenol, and alcoholic liquors such as fusel oil. Two or more semi-polar organic compounds are useful.

Also, electrolytes such as inorganic bases, inorganic acids, inorganic salts, organic bases, organic acids, and organic salts can be incorporated into the micellar dispersion. Examples of useful electrolytes are found in United States Patent Nos. 3,297,084 and 3,330,343. Preferably, the electrolytes are inorganic acids, inorganic bases, and inorganic salts. Examples of preferable electrolytes include sodium sulfate, sodium chloride, sodium hydroxide, hydrochloric acid, sulfuric acid, and sodium nitrate.

The micellar dispersion can be water-external or oil external. It is preferred that the micellar dispersion consist of five components, i.e. hydrocarbon, aqueous medium, surfactant, electrolyte and semi-polar compound.

Preferably, the micellar dispersion has a specific gravity about equal to that of the formation fluids and more preferably between that of the formation fluids and that of the water drive. The micellar dispersion preferably has a mobility about equal to or less than that of the formation fluids. More preferably, a portion (e.g. at least about 5%) of the micellar dispersion can have graded mobilities from a low of about equal to or less than that of the mobility of the formation fluids to a high of the water drive.

Optionally, the micellar dispersion is followed by a mobility buffer. The mobility buffer should be compatible with the micellar dispersion and water drive. Purpose of the mobility buffer is to serve as a buffer between the micellar dispersion and the water drive, thus protecting the micellar dispersion from invasion by the water drive. The mobility buffer can be a lower molecular weight alcohol containing from 1 up to about 4 carbon atoms, a water-external emulsion, a water-external micellar dispersion, a thickened water, or any fluid acting similar to these. It can contain a mobility imparting agent (also identified as a thickening agent and viscosity imparting agent) to give desired mobility. Preferably, the mobility buffer is composed of an aqueous medium such as water and a thickening agent. Other components, e.g. corrosive inhibitors, bactericides, etc., can be incorporated into the mobility buffer to give desired characteristics. Examples of mobility imparting agents include sugars, dextrans, carboxy methylated cellulose, amines, polymers, glycerins, alcohols and mixtures of these agents. A particularly useful agent with aqueous medium is a high molecular weight partially hydrolyzed polyacrylamide, e.g. the Pusher products sold by Dow Chemical Company.

Where the mobility buffer is composed substantially of hydrocarbon, thickening agents such as different molecular weight polyisobutylenes can be used to increase the mobility thereof.

The mobility buffer can have a specific gravity about equal to or slightly greater than that of the micellar dispersion and preferably, it can be between that of the dispersion and that of the water drive. Also, the mobility buffer can have a mobility about equal to or less than that of the micellar dispersion, additionally it can have an average mobility between that of the micellar dispersion and the water drive. A preferred embodiment of this invention is to have at least a portion of the mobility buffer (e.g. from about 5% to about 100%) characterized as having mobilities graded increasingly from a low of the micellar solution to a high of the water drive.

Preferably, the crude oil in the formation fluids should be produced at a rate such that the velocity of fluids within the formation is below that of the critical velocity at which gravities of the crude oil and the micellar dispersion substantially integrate to cause fingering. That is, gravity segregation is preferably maintained throughout the process to protect against fingering. This gravity segregation phenomenon is discussed by R. J. Blackwell, J. R. Rayne, and W. M. Terry, "Factors Influencing the Efficiency of Miscible Displacement" AIME Transactions, T. P. 8047, page 6.

From about 1% up to about 20% formation pore volume of the micellar dispersion is preferred to effect efficient sweeping of the formation. More preferably, from about 2% up to about 10% formation pore volume is useful. The micellar dispersion can be followed with from about 1% to about 75% formation pore volume of mobility buffer—more preferably from about 5% up to about 50% is useful.

After the micellar dispersion and optionally the mobility buffer is injected through the injection means into the formation, the injection means is "shut-in" and the water drive is permitted to move these fluids through the formation.

It is intended that the invention not be limited by the specifics taught within this application, but that all equivalents obvious to those skilled in the art be included within the scope of the invention.

What is claimed is:

1. A process of recovering residual oil from a watered-out, permeable subterranean formation characterized as having at least one injection means in fluid communication with at least one production means, the formation being hydrodynamically controlled, the process comprising injecting into the formation a small but sufficient amount of a micellar dispersion to recover the residual oil from the formation and letting the hydrodynamically controlled water displace the micellar dispersion through the formation and recovering crude oil therefrom.

2. The process of claim 1 wherein the micellar dispersion is characterized as having an average specific gravity equal to about that of the formation fluids within the formation.

3. The process of claim 1 wherein the micellar dispersion is characterized as having an average specific gravity between that of the formation fluids within the formation and that of the hydrodynamically controlled water drive.

4. The process of claim 1 wherein the micellar dispersion has a mobility about equal to or less than about that of the formation fluids.

5. The process of claim 1 wherein a portion of the micellar dispersion is characterized as having graded mobilities from a low of about equal to or less than that of the formation fluids to a high of the hydrodynamically controlled water.

6. The process of claim 1 wherein a mobility buffer is injected into the subterranean formation after the micellar dispersion is injected therein.

7. The process of claim 6 wherein the mobility buffer is characterized as having a mobility about equal to or less than that of the micellar dispersion.

8. The process of claim 1 wherein the crude oil within the formation fluid is produced at a rate such that the velocity of the formation fluids is below that of the critical velocity at which gravities of the formation fluid and micellar dispersion substantially integrate to cause fingering.

9. The process of claim 1 wherein from about 1% to about 20% formation pore volume of the micellar dispersion is injected into the formation.

10. A process of recovering the residual oil from a watered-out, permeable substerranean formation characterized as having at least one injection means in fluid communication with at least one production means and being hydrodynamically controlled, the process comprising:

(1) injecting into the formation from about 1% to about 20% formation pore. volume of a micellar dispersion, then (2) injecting into the formation from about 1% to about 70% formation pore volume of a mobility buffer, and letting the hydrodynamically controlled water naturally displace the micellar dispersion and mobility buffer through the formation and recovering crude oil therefrom.

11. The process of claim 10 wherein the micellar dispersion is characterized as having an average specific gravity equal to about that of the formation fluids.

12. The process of claim 10 wherein the micellar dispersion has a mobility equal to about that or less than about that of the formation fluids.

13. The process of claim 10 wherein the mobility buffer has an average specific gravity equal to about that of the micellar dispersion.

14. The process of claim 10 wherein the mobility buffer has an average specific gravity between that of the micellar dispersion and that of the hydrodynamically controlled water drive.

15. The process of claim 10 wherein the mobility buffer is characterized as having a mobility equal to about that of or less than that of the micellar dispersion.

16. The process of claim 10 wherein a portion of the mobility buffer is characterized as having mobilities graded from a low of about equal to or less than that of the micellar dispersion to a high of the water drive.

17. The process of claim 10 wherein the crude oil in the formation fluids is produced at a rate such that the velocity of the formation fluids is below that of the critical velocity at which gravities of the formation fluids and micellar dispersion substantially integrate to cause fingering.

References Cited

UNITED STATES PATENTS

| | | | |
|---|---|---|---|
| 1,651,311 | 11/1927 | Atkinson | 166—9 |
| 2,885,003 | 5/1959 | Lindauer | 166—9 |
| 3,123,134 | 3/1964 | Kyte et al. | 166—2 |
| 3,261,399 | 7/1966 | Coppel | 166—9 |
| 3,266,570 | 8/1966 | Gogarty | 166—9 |
| 3,312,278 | 4/1967 | Warden | 166—9 |
| 3,324,944 | 6/1967 | Poettmann | 166—9 |
| 3,330,344 | 7/1967 | Reisberg | 166—9 |
| 3,348,611 | 10/1967 | Reisberg | 166—9 |
| 3,373,809 | 3/1968 | Cooke | 166—9 |

STEPHEN J. NOVOSAD, Primary Examiner